March 12, 1929.  R. EGELAND  1,705,244

MEASURING CONTAINER COVER

Filed April 4, 1928  2 Sheets-Sheet 1

INVENTOR
Rector Egeland

INVENTOR
Rector Egeland

Patented Mar. 12, 1929.

1,705,244

UNITED STATES PATENT OFFICE.

RECTOR EGELAND, OF ELGIN, ILLINOIS.

MEASURING CONTAINER COVER.

Application filed April 4, 1928. Serial No. 267,425.

This invention relates to improvements in a measuring container cover which will have the seal tight qualities attained at present by various corks or covers now in use, combined with a means for measuring liquids or powdered, granulated or solid substances in quantities as may be prescribed.

The effectiveness of medicines is dependent upon the proper quantities used, a caution which if disregarded has in many instances fatal results. Conversely the effective action may be nil due to an insufficient quantity used. This in turn may result in the loss of public favor for a worthy remedy of which there are scores in daily use for slight ailments of our every day life. Assurance will also be given the medical profession which is most vitally interested in the proper use of medicines prescribed.

In addition to providing a sanitary measuring container cover, a simply operated economical sealing device is provided, serving the double purpose of holding the measuring container cover in place forming a part of the container and sealing same.

In the accompanying drawings which illustrate a preferred embodiment of this invention and in which similar reference numerals refer to same features in different views.

Figure 2:
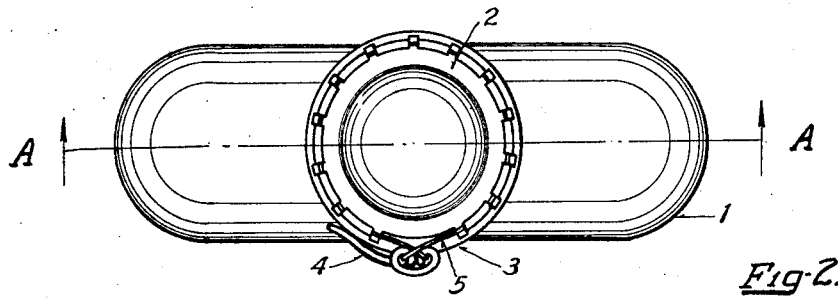
Figure 2 is a top or plan view of the container, measuring cover and sealing device shown in Figure 1.
Figure 1:
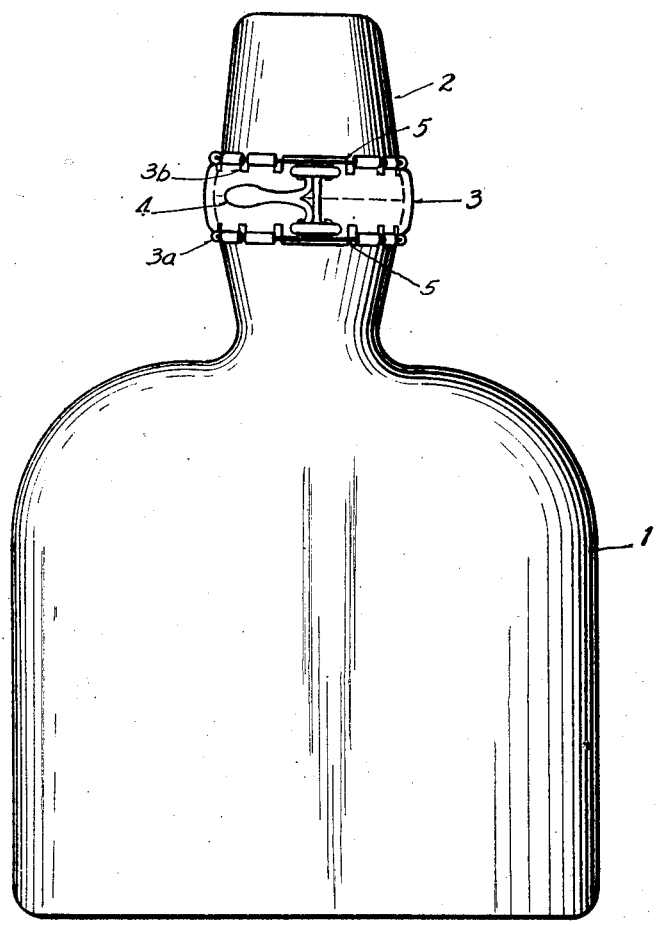
Figure 1 is an elevation or side view of a glass container involving this invention showing the measuring cover and sealing device.

The container as illustrated to which my invention applies consists of a container 1 having a sanitary measuring container cover 2 secured and sealed in place by the locking sealing device 3 which operated by a slight pressure of the finger on the eccentric lever 4.

The container 1 for purposes of illustration is an ordinary glass flask with a brim $1^a$ beveled inward with a slightly convex neck $1^b$. The measuring cover which may be graduated or marked as desired is also for purposes of illustration a glass cover 2 with a beveled brim $2^a$ beveled outward in a parallel plane with the bevel $1^a$. The outside face $2^b$ of the cover at the brim is similar in convexity to that of the flask at $1^b$.

The sealing sleeve 3 is made of a light flexible sheet metal lined with cork or other sealing substance 6 with the upper and lower edge slotted as at $3^b$ and formed into cylindrical shapes $3^a$ around the entire sleeve with the exception of a small section occupied by the eccentric lever 4. A wire 5 is threaded through the cylindrical sleeves $3^a$ and its ends are hooked to opposite eyes $4^b$ of the eccentric lever 4.

Figure 4:
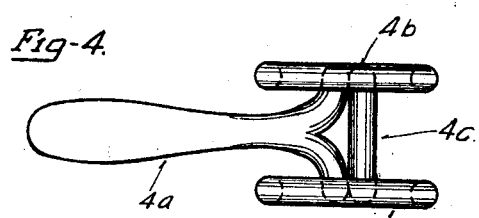
Figure 4 is a plan view of the eccentric lever used on the sealing device shown on Figures 1 and 2.
Figure 6:
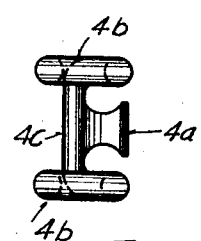
Figure 6 is an end elevation of the eccentric lever shown in Figure 4.
Figure 5:
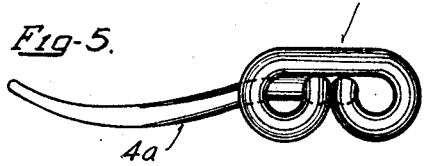
Figure 5 is a side elevation of the eccentric lever shown in Figure 4.

The eccentric lever 4 for this illustration is formed from a heavy rigid wire as shown in Figures 4, 5 and 6 into two eyelets $4^b$ on each side, stiffened by the cross bar $4^c$ and either twisted or welded and shaped to form the handle $4^a$. Forming from one piece of material may be started either at the handle $4^a$ or at the cross bar $4^c$.

With the parts separately described as above the following description will associate each part with the other to fully picture the purpose of each.

Figure 3:
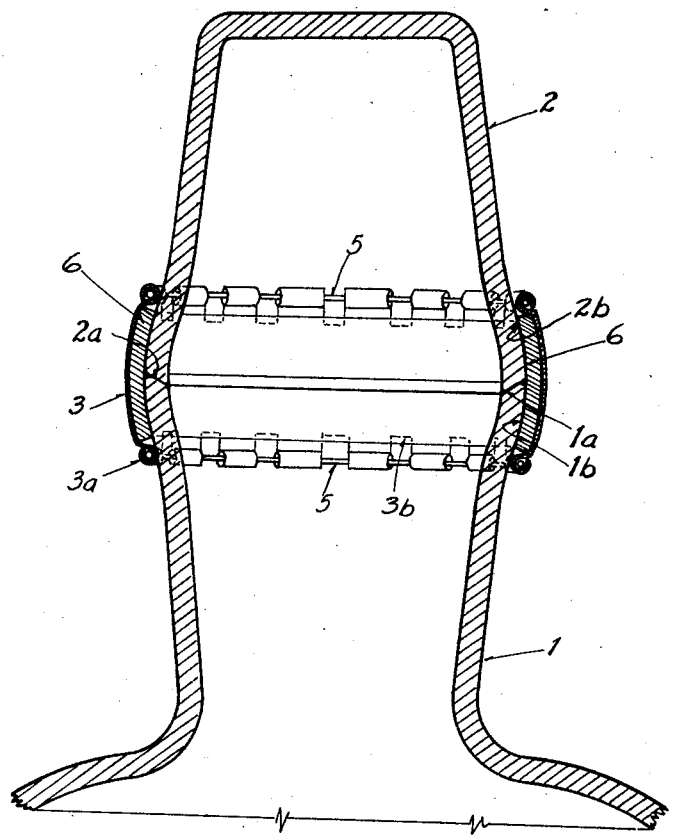
Figure 3 is an enlarged sectional view upon line AA of the top portion of the container in Figures 1 and 2 showing the measuring cover and sealing device, a portion of which is viewed through the glass container.

Figure 3 illustrates how the beveled brims $1^a$ and $2^a$ fit together; the reason for this being, that when used for liquids the cover after being replaced will have a liquid coating, quantity of which is dependent upon the density of the liquid. With the cover and flask brim beveled as shown, this liquid will run back into the flask thus eliminating waste.

The sleeve is placed over the convex lip $1^b$ and $2^b$ of the flask and cover with the lever 4 to the right and the wire 5 relaxed. The eccentric lever 4 is then moved to the left by a slight pressure of the finger placing tension on the wire 5 and sealing the cover onto the flask, with the cork filler 6, by the pressure exerted horizontally and vertically on the convex surfaces $1^b$ and $2^b$ of the flask and cover.

When flask is to be used tension is released on the wires 5 by moving the eccentric lever to the right. The sealing sleeve can then be slipped down over the convex surface $1^b$ and $2^b$ to the neck of the bottle, always convenient for re-use.

The foregoing detailed description has been given for clearness of understanding and no unnecessary limitation should be understood therefrom; but the claims should be construed as broadly as possible in view of the prior art.

What I regard as new, and desire to secure by Letters Patent, is:—

1. In a sealing sleeve, a convex band of metallic substance, lined with a sealing substance, slotted on both edges, with extended metal between slots formed into a cylindrical shape.

2. In a sealing sleeve, a convex band of metallic substance, lined with a sealing substance, slotted on both edges, with extended metal between slots formed into a cylindrical shape, through which a wire is threaded.

3. In a sealing sleeve, a convex band of metallic substance, lined with a sealing substance, slotted on both edges, with extended metal between slots formed into a cylindrical shape, through which a wire is threaded whose ends are hooked into opposite adjacent eyes of an eccentric lever.

4. In an eccentric lever, a lever handle, two adjacent eyes on each side of lever handle in a parallel or angling plane reinforced by a separating cross bar.

5. In an eccentric lever, a lever handle, two adjacent eccentric eyes on each side of lever handle in a parallel or angling plane reinforced by a separating cross bar.

6. In an eccentric lever, a lever handle, two adjacent eccentric eyes on each side of lever handle in a parallel or angling plane reinforced by a separating cross bar formed from one piece of metal.

In testimony whereof I affix my signature.

RECTOR EGELAND.